United States Patent [19]

Fyson

[11] Patent Number: 5,350,522
[45] Date of Patent: Sep. 27, 1994

[54] EFFLUENT TREATMENT

[75] Inventor: John R. Fyson, London, United Kingdom

[73] Assignee: Eastman Kodak Company, Rochester, N.Y.

[21] Appl. No.: 984,415

[22] PCT Filed: Sep. 5, 1991

[86] PCT No.: PCT/EP91/01680
§ 371 Date: Mar. 4, 1993
§ 102(e) Date: Mar. 4, 1993

[87] PCT Pub. No.: WO92/04660
PCT Pub. Date: Mar. 19, 1992

[30] Foreign Application Priority Data

Sep. 7, 1990 [GB] United Kingdom ............... 9019605.6

[51] Int. Cl.$^5$ ............................ C02F 1/28; C02F 1/42; C02F 1/62; C02F 1/72
[52] U.S. Cl. .................................. 210/667; 210/669; 210/721; 210/726; 210/759; 210/694; 210/683; 210/912
[58] Field of Search ............... 210/724, 726, 759, 912, 210/681, 683, 694, 721, 665, 667, 669

[56] References Cited

U.S. PATENT DOCUMENTS

| | | |
|---|---|---|
| 3,829,549 | 8/1974 | Andersen et al. ...................... 423/43 |
| 4,128,424 | 12/1978 | Geyken et al. ....................... 210/748 |
| 4,332,687 | 6/1982 | Daignault et al. .................... 210/721 |
| 4,874,530 | 10/1989 | Kobayashi et al. .................. 210/718 |

FOREIGN PATENT DOCUMENTS

| | | |
|---|---|---|
| 2630661 | 1/1978 | Fed. Rep. of Germany . |
| 337215 | 4/1984 | Fed. Rep. of Germany . |
| 51-049564 | 4/1976 | Japan . |
| WO85/02690 | 6/1985 | PCT Int'l Appl. . |

Primary Examiner—Neil McCarthy
Attorney, Agent, or Firm—Sarah Meeks Roberts

[57] ABSTRACT

A method for treating photographic effluent to remove harmful pollutants and which reduces silver and iron ion concentrations in the effluent to no more than about 2 ppm is disclosed. The method includes an oxidation step to convert reducing sulfur compounds to oxidized products; a heavy metal ion precipitation step; a step of adding a developing agent absorbent and a sequestering agent absorbent; and a step of separating a produced solid phase from a liquid phase. The separated Liquid phase is environmentally acceptable.

14 Claims, No Drawings

EFFLUENT TREATMENT

This invention relates to effluent treatment, and in particular to the removal of polluting materials from photographic effluent to render it more environmentally acceptable, by the sequential treatment of the effluent with chemical reagents which will cause differential precipitation of the pollutants.

The overflow from a photographic processor will typically consist of polluting substances such as heavy metal ions, sequestering agents, substances that have a high oxygen demand and colour developing agents and their derivatives, straight disposal of which contravenes sewer regulations in many parts of the world. It is therefore essential that the overflow is converted by chemical or physical means to a liquid which can be poured into the sewer and/or a residual solid which can be removed to a place of safe and legal disposal.

It is known that addition of an oxidising agent to liquid effuent will reduce the chemical oxygen demand (COD) of the mixture by converting the reducing sulphur compounds to their oxidised form by destruction of thiosulphate and by precipitation of silver salts, as described in the Proceedings of the SPSE conference on "Environmental Issues in Photofinishing" 1987. Furthermore, Japanese Patent No. 51099854 describes the use of an oxide, hydroxide or water soluble salt of an alkaline earth metal to precipitate heavy metal ions in a photographic waste effluent.

The use of activated carbon to remove colour developing agents, and of an ion-exchange resin to remove a sequestering agent, such as ethylene diamine tetraacetic acid (EDTA) is also established in the art.

However, nowhere has there been described or even suggested that these steps may be combined into a sequential effluent treatment, preferably effected in a single vessel, in which polluting materials are removed from a liquid chemical effluent by adding reagents that sequentially cause different pollutants or their derivatives to precipitate. A time delay may be necessary between additions to allow one reaction to complete before another is started, if the reactions will or might interfere. Such a differential precipitation technique has many advantages in that the mechanical means, number of steps for separations and total process times are all reduced by removing transfer and separation procedures. Treatment in one vessel is less expensive than using individual units, allows a small compact module for treating the effuent at small processing sites and results in a small mass and volume of easily disposable solid wastes.

The process can be applied to the mixed overflows from all the baths in the photographic processing machine or to the overflow from a single bath that is contaminated by more than one polluting substance.

The effluent to be treated may, for example, have arisen from any of the photographic processes described in Item 308119, Research Disclosure December 1989, Industrial Opportunities Ltd., Hants., U.K., and especially sections XIX, XX and XXIII thereof.

The one-vessel method would be applicable furthermore to any liquid chemical effuent that was deleterious to the environment providing a chemical or physical means of precipitating the damaging components could be found.

The solids produced from the above reactions can be removed by some mechanical means in one process step, such as centrifugation or filtration, in particular as described in co-pending U.K. application No. 9019607.2, filed on even date herewith, in which an inert powder of high bulk increases the effectiveness and rate of filtration. Preferably this powder may be added during sequential precipitation treatment rather than as a final stage of the effluent treatment.

According to the present invention therefore there is provided a method of treating photographic effluent by precipitating or otherwise removing harmful pollutants to provide an environmentally acceptable liquid phase and a disposable solid phase. Preferably the separation is carried out by differential precipitation of the pollutants through sequential addition of chemical reagents.

The order in which the different precipitants are added may be varied or more than one precipitant may be added simultaneously. However for effective treatment it is advisable to add the oxidising agent as the initial stage. Conveniently, a short period is then allowed for the necessary reactions to occur, otherwise the oxidising agent may be decomposed before it reacts with the other solids present. The alkali, activated carbon and, where used, the inert powder of high bulk to aid filtration may then be added separately or at the same time, followed finally by the addition of the component to remove the sequestering agent.

Suitable oxidising agents may be inorganic or organic and may include permanganate, perchromate, persulphate, perphosphate, perborate or percarbonate, benzyl or urea peroxide but conveniently hydrogen peroxide is used, usually 30%, preferably in an amount of 20 to 100 ml/l, most preferably 30 to 50 ml/l of effluent.

Alternatively it is sometimes useful to have the oxidant as a solid since this is easier and safer to dose by hand or can also be dispensed by similar automatic means to the other solids in the process. In particular sodium percarbonate is especially useful as it has a high oxygen content and has the added benefit of reducing the amount of calcium hydroxide required in the step as detailed hereunder, by nature of its being alkaline.

The heavy metal ions are removed by the addition of an excess of a metal hydroxide, oxide or carbonate, preferably a Group II metal hydroxide, such as zinc, cadmium, mercury, magnesium or most preferably calcium hydroxide to the resulting precipitate. This alkali may be used in the form of a solution, powder, slurry or as pellets and sufficient must be added to render the effluent alkaline. Generally an amount of from 20 g to 90 g/liter effluent has been found to be suitable. Addition of an alkaline earth compound also precipitates most of the sulphur compounds as the sulphate and dithionates are converted to their insoluble counterparts for subsequent removal.

The activated carbon, in an amount of 15 to 30 g/l effluent, for removing the colour developing agent and the inert powder for assisting filtration may be added prior to the alkaline addition, coterminously or subsequently but conveniently all three reagents may be added simultaneously. The inert powder may be aluminium hydroxide, a diatomaceous earth such as kieselguhr or even wet sawdust, preferably in the range from 10 to 100 g/l effluent, most preferably 25 to 35 g/liter.

The sequestering agent such as EDTA or propylene diamine tetraacetic acid (PDTA) may be removed by the subsequent addition of an ion-exchange resin, such as Zerolit TM FFip, preferably in an amount of 75 to 125 g/liter effluent which also reduces the pH by partial removal of hydroxide ions. Alternatively and preferably the salt of a Group III or transition metal such as aluminium sulphate may be added, as disclosed in co-pending U.K. application No. 9019606.4, filed on even date herewith, in which the metal complex is precipitated from alkaline solution whilst restoring the effluent to a more neutral pH without the addition of extra acid.

The precipitate can then be removed by some mechanical means such as filtering, settling or centrifugation to provide an aqueous phase which is considerably more environmentally acceptable and a solid waste which is readily disposable.

The invention will now be illustrated with reference to the following Example which does not in any way limit the scope of the invention.

EXAMPLE 1

Sequential Precipitation

A model processor effluent was made by combining 300ml of the following developer/amplifier with 500ml of a bleach-fix, also described below:

| Developer/Amplifier: | |
|---|---|
| potassium carbonate | 20 g |
| diethylhydroxylamine | 5 g |
| ethylenediaminetetraacetic acid (EDTA) | 1 g |
| Colour developer CD3 | 4 g |
| 30% hydrogen peroxide | 5 g |
| water to | 1 liter |
| pH adjusted to 10.3 with sulphuric acid or NaOH | |
| Bleach Fix: | |
| sodium iron (III) EDTA | 20 g |
| sodium thiosulphate | 50 g |
| sodium sulphite | 20 g |
| acetic acid | 20 ml |
| water to | 1 liter |
| pH adjusted to 5.5 with acetic acid | |

0.8 g of silver chloride was added to this mixture and this was stirred until it had dissolved. The mixture was left to stand overnight to allow most reactions to complete.

100ml of this model effluent were poured into a 250 ml beaker. To this was added 4 ml of hydrogen peroxide to reduce the oxygen demand of the mixture by converting the reducing sulphur compounds to their oxidised form. This mixture was stirred for two minutes to allow the reactions to complete. 2.8 g of calcium hydroxide were then added to the mixture to precipitate the iron and most of the oxidised sulphur compounds. Following this, 2 g of activated charcoal was added to remove colour developing agents and their derivatives, and also the diethylhydroxylamine. After one minute stirring, 10 g of Zerolit TM FFip ion-exchange resin was added to remove the sequestering agent, EDTA, and also to reduce the pH by partial removal of hydroxide ions.

The mixture was filtered by standard means using fast filter paper and the filtrate was analyzed.

All additions were carried out at room temperature with no deliberate temperature or pressure control.

Table 1 gives the concentrations of components before and after treatment.

TABLE 1

| Component | Concentration before treatment | Concentration after treatment |
|---|---|---|
| Iron | 1875 ± 300 ppm | <2 ± 2 ppm |
| EDTA | 9375 ± 500 ppm | <100 ± 100 ppm |
| Colour Developer (CD3) | 1100 ± 50 ppm | <10 ± 10 ppm |
| Chemical Oxygen Demand | 10 ± 2 g/liter | <1 ± 1 g/liter |
| Silver | 713 ± 10 ppm | 2 ± 1 ppm |

Table 1 shows that all the pollutants measured are removed to an extent that they cannot reliably be detected by the analytical methods employed.

EXAMPLE 2

The above process was repeated using, however, as oxidising agent 4g sodium percarbonate instead of the 4 ml hydrogen peroxide, thereby reducing to 1.5 g the amount of calcium hydroxide required to precipitate the iron and most of the oxidised sulphur compounds.

The concentrations of components after treatment were again as given in Table 1.

I claim:

1. A method of treating a photographic effluent to remove harmful pollutants, including heavy metal ions comprising silver and iron ions, comprising:
   (a) providing a vessel containing a liquid photographic effluent that includes harmful pollutants;
   (b) introducing into said vessel an oxidizing agent selected from the group consisting of hydrogen peroxide, a percarbonate, a permanganate, a perchromate, a persulfate, a perphosphate, or a perborate to convert reducing sulfur compounds to oxidized products;
   (c) after a period of time sufficient for said oxidizing agent to convert reducing sulfur compounds to oxidized products, introducing into said vessel chemical reagents comprising a heavy metal ion precipitant selected from a metal hydroxide, oxide or carbonate, a developing agent absorbent, and a sequestering agent absorbent, thereby producing a mixture comprising a solid phase and an environmentally acceptable liquid phase;
   (d) separating and removing said solid phase from said liquid phase, wherein said liquid phase has silver and iron ions in a concentration of each of no more than about 2ppm; and
   (e) disposing of said solid phase.

2. A method according to claim, 1 wherein said oxidizing agent is hydrogen peroxide.

3. A method according to claim 1 wherein said oxidizing agent is sodium percarbonate.

4. A method according to claim 1 wherein said heavy metal ion precipitant comprises a Group II metal hydroxide.

5. A method according to claim 4 wherein said Group II metal hydroxide is calcium hydroxide.

6. A method according to claim 1 wherein said developing agent absorbent is activated carbon.

7. A method according to claim 1 wherein said sequestering agent absorbent comprises an ion-exchange resin.

8. A method according to claim 1 wherein said sequestering agent precipitant comprises a Group III or transition metal salt.

9. A method according to claim 8 wherein said metal salt is aluminum sulfate.

10. A method according to claim 1 wherein said precipitant and said absorbent are introduced sequentially.

11. A method according to claim 1 wherein said precipitant and said absorbent are introduced simultaneously.

12. A method according to claim 1 wherein said separating and removing said solid phase from said liquid phase is carried out by filtration, settling, or centrifugation.

13. A method according to claim 1 further comprising adding an inert filtration-assisting powder prior to said separating and removing said solid phase from said liquid phase.

14. A method according to claim 1 wherein said oxidizing agent is hydrogen peroxide or sodium percarbonate, said heavy metal ion precipitant is a Group II metal hydroxide, and said developing agent absorbent is activated carbon, said method further comprising introducing into said vessel, following the introduction of said chemical reagents and prior to separating and removing said solid phase from said liquid phase, a sequestering agent absorbent comprising an ion-exchange resin.

* * * * *

UNITED STATES PATENT AND TRADEMARK OFFICE
CERTIFICATE OF CORRECTION

PATENT NO. : 5,350,522
DATED : 9/27/94
INVENTOR(S) : Fyson

It is certified that error appears in the above-indentified patent and that said Letters Patent is hereby corrected as shown below:

Title page, item [57] Abstract, lines 7 and 8, change "absorbent" --adsorbent-- throughtout and line 9, make "Liquid" --liquid--.

Column 4, claim 1(c) line 42, and claims 6 and 7.
Column 5, claims 10 and 11 and column 6, claim 14, lines 6 and 11
.......... change "absorbent" to --adsorbent-- throughout.

Signed and Sealed this

Twenty-second Day of November, 1994

Attest:

BRUCE LEHMAN

*Attesting Officer*   *Commissioner of Patents and Trademarks*